(12) United States Patent
Zhong et al.

(10) Patent No.: US 8,772,383 B2
(45) Date of Patent: Jul. 8, 2014

(54) MATERIAL FOR ALIGNMENT LAYER OF LIQUID CRYSTAL DISPLAY

(75) Inventors: Xinhui Zhong, Guandong (CN); Hongji Huang, Guandong (CN); Kuancheng Lee, Guandong (CN)

(73) Assignee: Shenzhen China Star Optoelectronics Technology co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/635,405

(22) PCT Filed: Aug. 3, 2012

(86) PCT No.: PCT/CN2012/079614
§ 371 (c)(1),
(2), (4) Date: Sep. 15, 2012

(87) PCT Pub. No.: WO2014/012278
PCT Pub. Date: Jan. 23, 2014

(65) Prior Publication Data
US 2014/0024751 A1   Jan. 23, 2014

(51) Int. Cl.
*C08G 73/10* (2006.01)
*C08L 77/00* (2006.01)
*C08L 79/08* (2006.01)

(52) U.S. Cl.
CPC ..................... *C08L 79/08* (2013.01)
USPC .......................................... 524/104; 524/607

(58) Field of Classification Search
CPC .................................. C08K 5/34; C08G 73/10
USPC ........................................................... 524/104
See application file for complete search history.

(56) References Cited

U.S. PATENT DOCUMENTS 7,575,788 B2 * 8/2009 Komitov et al. ............... 428/1.2
2009/0194737 A1   8/2009 Lai et al.

FOREIGN PATENT DOCUMENTS

CN    101389595 A    3/2009
JP    2005173397 A    6/2005

* cited by examiner

*Primary Examiner* — Hui Chin
(74) *Attorney, Agent, or Firm* — Andrew C. Cheng

(57) ABSTRACT

The present invention provides a material for alignment layer of liquid crystal display, which includes a solvent and a polymer dissolved in the solvent. The polymer includes a backbone and a first side chain linked to the backbone. The first side chain has a stronger lateral dipole moment. The material for alignment layer of liquid crystal display is characterized in that a first side chain that contains both a flexible chain segment and rigid chain segment is linked to the backbone of the polymer and the first side chain has a stronger lateral dipole moment, making it taking a rotation or tilting motion under the application of an electric field so as to effect alignment of the liquid crystal molecules in the pre-tilt angle.

10 Claims, 3 Drawing Sheets

MATERIAL FOR ALIGNMENT LAYER OF LIQUID CRYSTAL DISPLAY

BACKGROUND OF THE INVENTION

1. Field of the Invention

The present invention relates to the field of liquid crystal displaying techniques, and in particular to a material for alignment layer of liquid crystal display (LCD).

2. The Related Arts

Liquid crystal used in twisted nematic (TN) or super twisted nematic (STN) liquid crystal display is positive liquid crystal. The liquid crystal molecules have a long axis that is arranged parallel to a substrate surface when no electricity is applied. The orientation of the liquid crystal molecules on the substrate surface is determined by rubbing direction of an alignment layer (which is usually made of polyimide). The alignment directions of two substrate surfaces are perpendicular to each other, whereby the molecules of the liquid crystal layer exhibit a continuously twisted arrangement from one substrate surface to another substrate surface. When a voltage is applied, the long axis of the liquid crystal molecule tends to align in the direction of electric field. Drawbacks of the TN or STN liquid crystal display are small viewable angle and severe brightness difference and color difference at large view angles. A compensation film must be applied to correct these problems and this increases the manufacture cost of display devices.

To overcome the various limitations and drawbacks of the TN/STN liquid crystal display, vertical alignment (VA) has been recently developed. Negative liquid crystal is used in VA technology, in which when no electrical field is applied, the liquid crystal molecules are arranged to perpendicular to substrate surfaces and when an electrical field is applied, the liquid crystal molecules are rotated or tilted toward a direction parallel to the substrate.

To overcome the limitation of view angle, the VA technology adopts various ways to effect multiple angle alignment. Namely, a pixel is divided into multiple domains and liquid crystal molecules in different domains are caused to tilt in different directions so that the display, when viewed from different directions, can provide similar viewing effect. Several ways discussed below are currently adopted to realize multiple angle alignment. As shown in FIG. 1A, the first way is to form polymer bumps 108 on upper and lower glass substrates 102, 103 of an LCD by means of exposure development in order to cause a pre-tilt angle for liquid crystal molecules around the polymer bumps 108 and thus guiding the liquid crystal molecules 106 to tilt in predetermined directions. As shown in FIG. 1B, the second way is to form an ITO pixel electrode 304 on upper and lower glass substrates 302, 303 in such a way as to form a predetermined pattern so that an electric field generated thereby shows a predetermined tilt angle thereby controlling the orientations of the liquid crystal molecules 306 in different domains. This technique is often referred to as patterned vertical alignment (PVA). As shown in FIG. 2, the third way is to form ITO slits 501 on a TFT side of a lower glass substrate 500, while ITO 504 of an upper glass substrate 502 remains intact. Polymerizable monomer 508 is added in the liquid crystal medium. An electric field is first applied to cause tilting of the liquid crystal molecules 506 and then ultraviolet ray is applied to irradiate the panel so as to polymerize the monomers to form polymer bumps 510 that guide the tilting of the liquid crystal molecules 506 and are deposited on the surfaces of the upper and lower glass substrates 500, 502 to achieve an effect of alignment. This technique is referred to as polymer stabilized vertical alignment (PSVA).

The above three ways of effecting alignment are more or less difficult and complicate in either the process of the material. Aperture ratio and contrast must be sacrificed in order to achieve multiple angle alignment and this deteriorates the optic performance of a liquid crystal panel.

SUMMARY OF THE INVENTION

An object of the present invention is to provide a material for alignment layer of liquid crystal display, which realizes multiple angle alignment, reduces the difficult of manufacturing, and improve optic performance of liquid crystal panel.

To achieve the object, the present invention provides a material for alignment layer of liquid crystal display, which comprises a solvent and a polymer dissolved in the solvent. The polymer comprises a backbone and a first side chain linked to the backbone. The first side chain has a stronger lateral dipole moment.

The backbone of the polymer comprises a structure of polyimide or polyamic acid, which has the following formula:

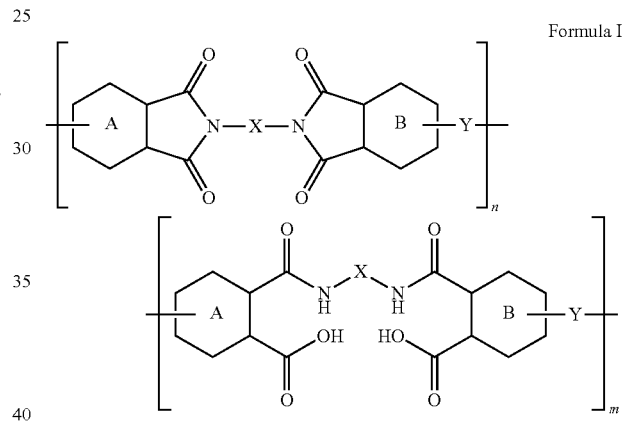

Formula I wherein the ring A and ring B are benzene rings, aromatic rings, or fused-ring aromatic compounds; X and Y are linking moieties; and n and m represent the degree of polymerization, the values of n and m being in a range of 20 to 2000.

X and Y are represented by the following formulas:

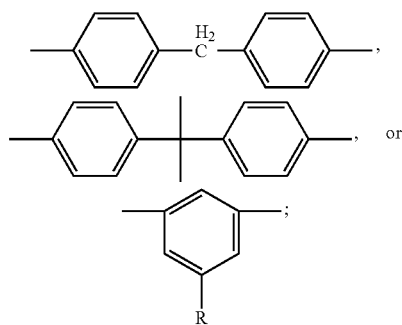

the value of n and m are preferably in the range of 50 to 500.

The first side chain of the polymer comprises two obviously distinguished segmented structures, which are respectively a flexible chain segment linked to the backbone and a rigid chain segment linked to the flexible chain segment. The rigid chain segment has a stronger lateral dipole moment.

The first side chain of the polymer has one of the following formulas:

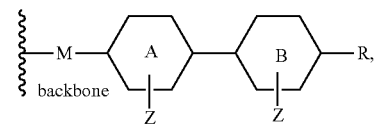
Formula II

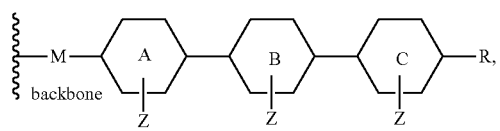
Formula III wherein in formulas II and III, M is the flexible chain linked to the backbone and is formed by a molecular main chain composed of 3-25 C, O, S, N, and Si atoms; ring A, ring B and ring C are five- or six-membered rings or ring structures with or without N, S, and O heteroatoms; rings A, B, and C are identical or different, rings A, B and C being saturated, unsaturated, or aromatic rings; Z is substituted moiety on rings A, B and C and can be identical or different, being mono-substituted or polysubstituted on a single ring is allowable, Z is —CN, —F, —Cl, —Br, —NCS, —CF$_3$, —OCF$_3$, or —OCHF$_2$; R is the terminal moiety of the first side chain which is a carbon chain composed of H or 1-8 carbons.

The first side chain of the polymer takes 5-40% molecular weight of the polymer.

The polymer further comprises one, two or all of a second side chain, a third side chain, and a fourth side chain.

The second side chain is a flexible side chain, which is formed by a molecular main chain composed of 3-25 C, O, S, N, or Si atoms; the third side chain is a polar side chain, which is hydroxyl, carboxyl, or a ring structure contains hydroxyl or carboxyl; the fourth side chain is a rigid side chain composed of chain segments that contain 2-3 rings.

The polymer takes 1-20% total weight of the material for alignment layer.

The solvent is selected from one of or a mixture of multiple ones of N-methyl-2-pyrrolidone, N-ethyl-2-pyrrolidone, γ-butyrolactone, ethylene glycol mono-n-butyl ether, and dimethylacetamide.

The present invention also provides a material for alignment layer of liquid crystal display, which comprises a solvent and a polymer dissolved in the solvent, the polymer comprising a backbone and a first side chain linked to the backbone, the first side chain having a stronger lateral dipole moment;

wherein the backbone of the polymer comprises a structure of polyimide or polyamic acid, which has the following formula:

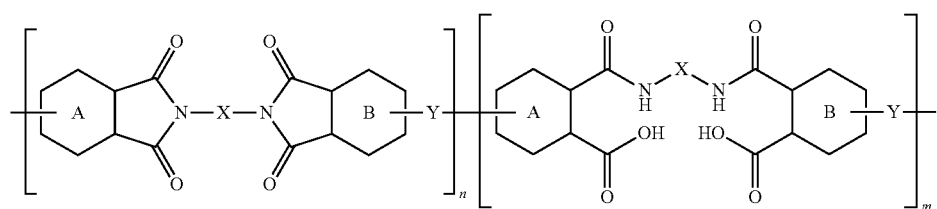
Formula I wherein the ring A and ring B are benzene rings, aromatic rings. or fused-ring aromatic compounds; X and Y are linking moieties; and n and m represent the degree of polymerization, the values of n and m being in a range of 20 to 2000;

wherein X and Y are represented by the following formulas:

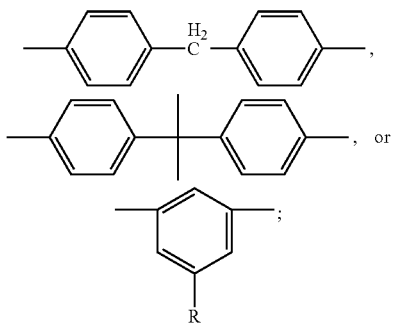

the value of n and m are preferably in the range of 50 to 500;

wherein the first side chain of the polymer comprises two obviously distinguished structures which are respectively a flexible chain linked to the backbone and a rigid chain linked to the flexible chain, the rigid chain having a stronger lateral dipole moment;

wherein the first side chain of the polymer has one of the following formulas:

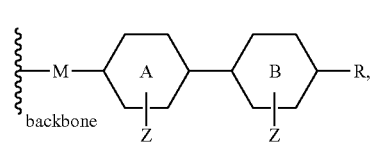
Formula II

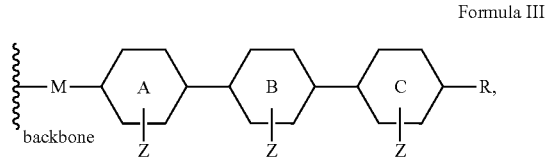
Formula III wherein in formulas II and III, M is the flexible chain linked to the backbone and is formed by a molecular main chain composed of 3-25 C, O, S, N, and Si atoms; ring A, ring B and ring C are five- or six-membered rings or ring structures with or without N, S, and O heteroatoms; rings A, B, and C are identical or different, rings A, B and C being saturated, unsaturated, or aromatic rings; Z is substituted moiety on rings A, B and C and can be identical or different, being mono-substituted or polysubstituted on a single ring is allowable, Z is —CN, —F, —Cl, —Br, —NCS, —CF$_3$, —OCF$_3$, or —OCHF$_2$; R is the terminal moiety of the first side chain which is a carbon chain composed of H or 1-8 carbons;

wherein the first side chain of the polymer takes 5-40% molecular weight of the polymer;

wherein the polymer takes 1-20% total weight of the material for alignment layer; and wherein the solvent is selected from one of or a mixture of multiple ones of N-methyl-2-pyrrolidone, N-ethyl-2-pyrrolidone, γ-butyrolactone, ethylene glycol mono-n-butyl ether, and dimethylacetamide.

The efficacy of the present invention is that the present invention provides a material for alignment layer of liquid crystal display, which includes a polymer of which the molecular structure is characterized in that the polymer comprises a backbone to which a first side chain that contains both a flexible chain segment and rigid chain segment is linked and the first side chain has a stronger lateral dipole moment, making it taking a rotation or tilting motion under the application of an electric field so as to effect alignment of the liquid crystal molecules in the pre-tilt angle. Since the first side chain is linked to the backbone of the polymer, the degree of freedom for motion is less than that of the liquid crystal molecules, so that even the electrical field is removed after the formation of the pre-tilt angle, the alignment effect so provided does not vanish immediately and will maintain for a period of time, which is related to the specific structure of the first side chain used. In respect of multiple angle alignment, as compared to polymer stabilized vertical alignment, the present invention is simple in manufacturing process and may form an alignment film that has a flatter surface and smaller light leak and provide a liquid crystal panel with increased contrast so as to improve the optical performance of the liquid crystal panel.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

The present invention provides a material for alignment layer of liquid crystal display, which comprises a solvent and a polymer dissolved in the solvent. The polymer takes 1-20% total weight of the material. The solvent may comprise a single solvent or multiple solvents.

Figure 1A:
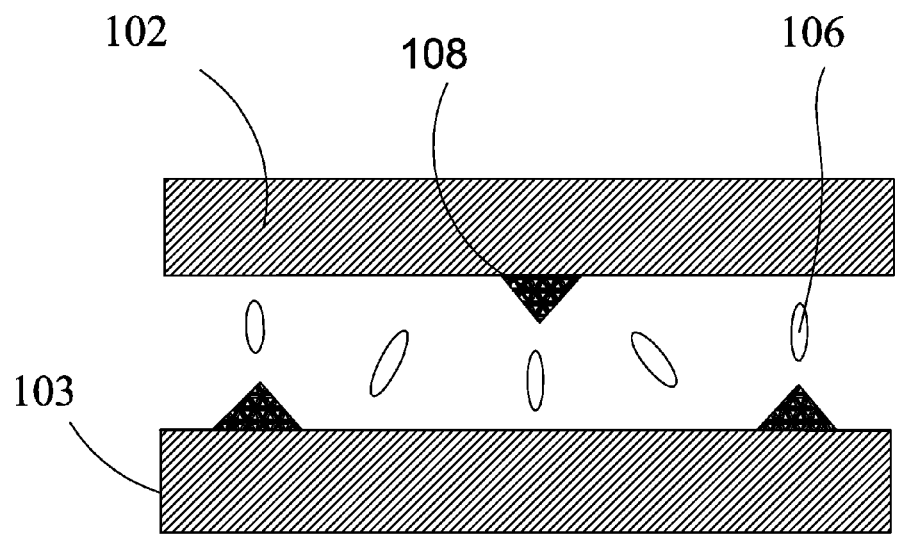
FIG. 1A is a schematic view illustrating the state of a liquid crystal medium layer after liquid crystal alignment of a liquid crystal display formed with exposure development techniques.
Figure 1B:
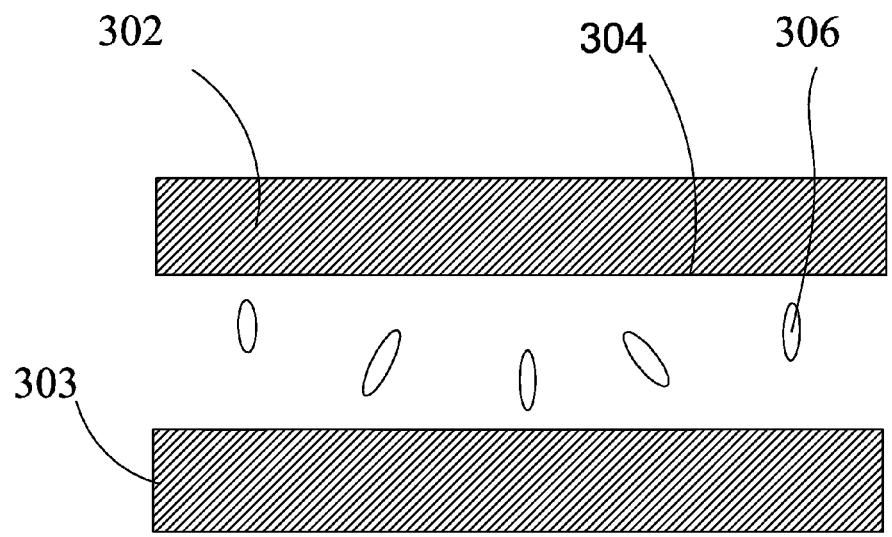
FIG. 1B is a schematic view illustrating the state of a liquid crystal medium layer after liquid crystal alignment of a liquid crystal display formed with vertical alignment techniques.
Figure 2:
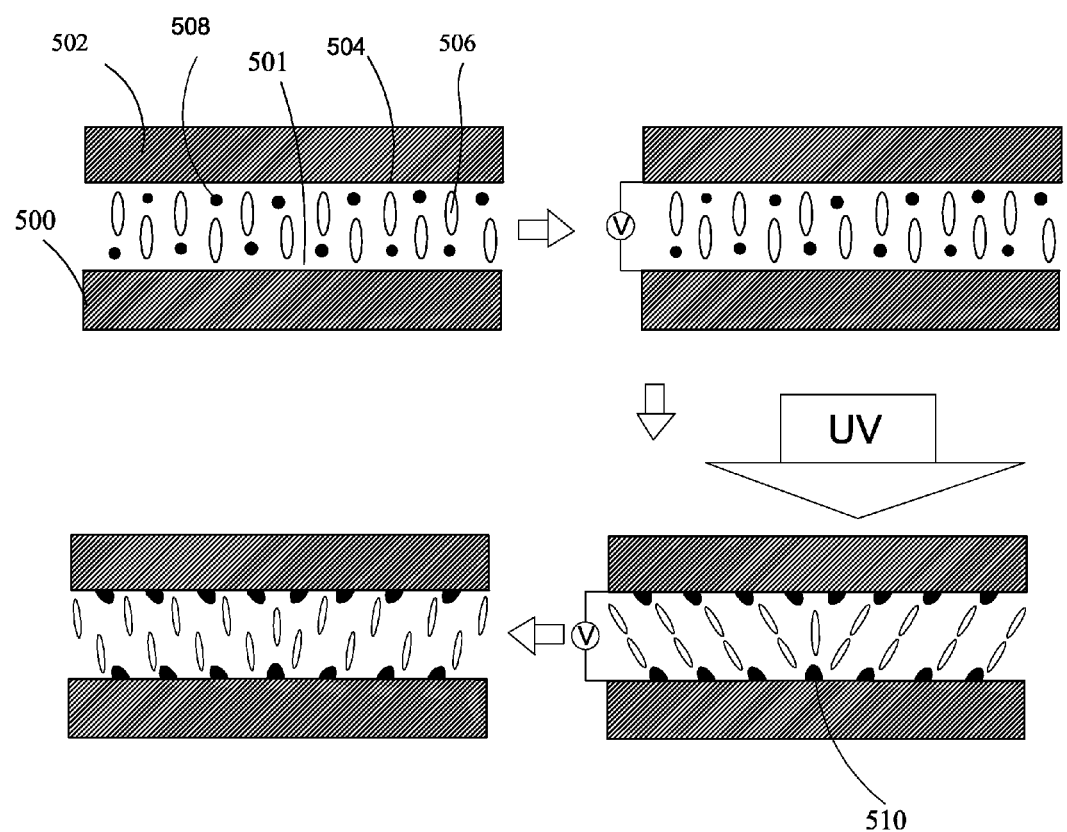
FIG. 2 is a schematic view illustrating liquid crystal alignment process of a liquid crystal display formed with polymer stabilized vertical alignment techniques.
Figure 3:
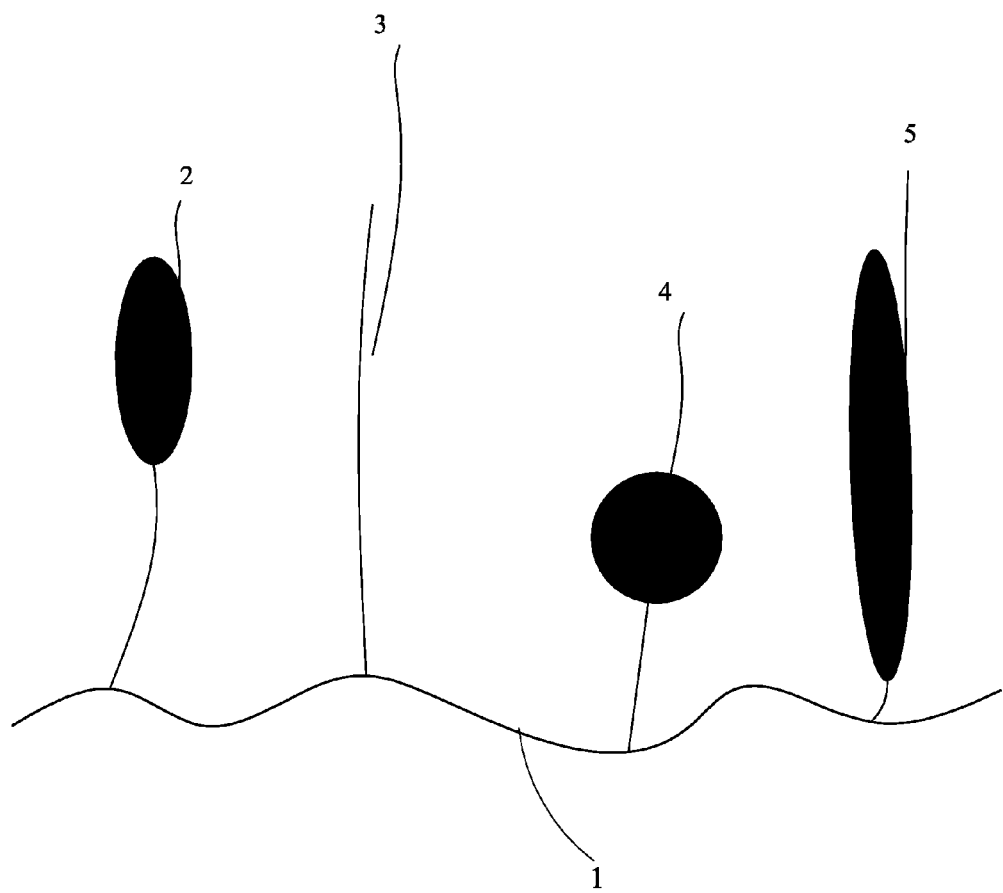
FIG. 3 is a schematic view showing the structure of a polymer used in the material for alignment layer of liquid crystal display according to the present invention.

As shown in FIG. 3, the polymer comprises a backbone 1 and a first side chain 2 linked to the backbone. The first side chain is a necessary structure of the polymer and has a stronger lateral dipole moment, making it take a rotation or tilting motion under application of an electric field so as to effect alignment of the liquid crystal molecules in the pre-tilt angle. The polymer further comprises one, two or all of a second side chain 3, a third side chain 4, and a fourth side chain 5.

The backbone 1 of the polymer comprises a structure of polyimide or polyamic acid, which has the following formula:

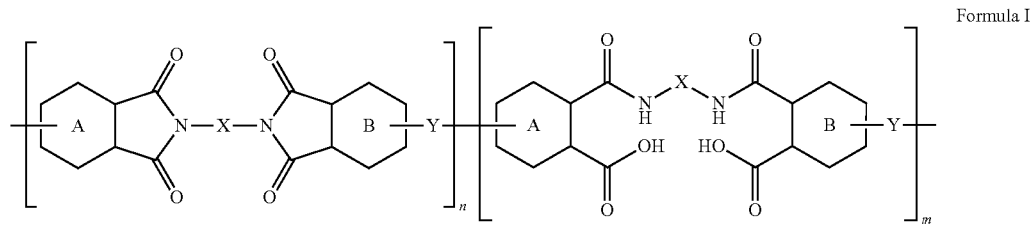

Formula I wherein the ring A and ring B are benzene rings, aromatic rings, or fused-ring aromatic compounds; and X and Y are linking moieties, which are not limited to any specific structure and are represented by for example the following formulas

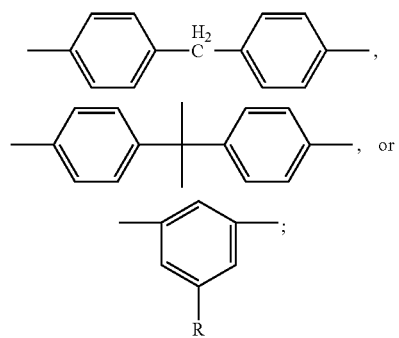

the value of n and m are in the range of 20 to 2000 and preferably in the range of 50 to 500.

The polyimide or polyamic acid backbone provides the polymer with excellent heat resistance, insulation, ion blocking property, and optic transparency.

The first side chain 2 of the polymer is a necessary structure of the polymer and comprises two obviously distinguished segmented structures, which are respectively a flexible chain segment linked to the backbone 1 and a rigid chain segment linked to the flexible chain segment. The rigid chain segment has a stronger lateral dipole moment, whereby under the application of electric field, the rigid segment of the first side chain 2 may undergo rotation and tilting motion to some extents in order to effect pre-alignment of the liquid crystal molecules.

The first side chain of the polymer has one of the following formulas II and III:

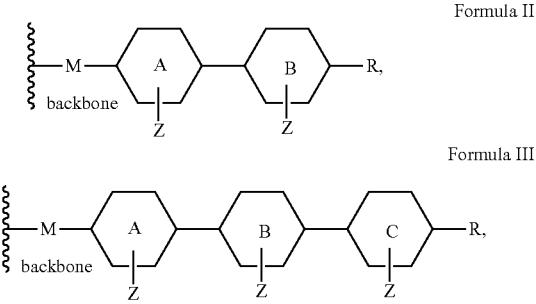

wherein in formulas II and III, M is the flexible chain linked to the backbone and is formed by a molecular main chain composed of 3-25 C, O, S, N, and Si atoms. For example M is —$CH_2CH_2CH_2CH_2CH_2CH_2CH_2CH_2$— or —$OCH_2CH_2CH_2CH_2CH_2CH_2CH_2CH_2$—, but not limited to these examples. Rings linked to M can be two, namely ring A and ring B (Formula II), or three, namely ring A, ring B, and ring C (Formula III). Ring A, ring B, and ring C can be five- or six-membered rings or ring structures without N, S, and O heteroatoms. Ring A, ring B, and ring C can be identical or different and can be saturated, unsaturated, or aromatic rings.

Z is substituted moiety on ring A, ring B, and ring C and can be identical or different and being mono-substituted or polysubstituted on a single ring is allowable. Z is —CN, —F, —Cl, —Br, —NCS, —$CF_3$, —$OCF_3$, or —$OCHF_2$. R is the terminal moiety of the first side chain 2 which is a carbon chain composed of H or 1-8 carbons.

The first side chain 2 of the polymer takes 5-40% molecular weight of the polymer.

The second side chain 3 is not a necessary structure of the polymer and is a flexible side chain, which is formed by a molecular main chain composed of 3-25 C, O, S, N, or Si atoms with a function to provide the polymer with an effect of vertical alignment of the liquid crystal molecules.

The third side chain 4 is not a necessary structure of the polymer and is a polar side chain, which is hydroxyl, carboxyl, or a ring structure contains hydroxyl or carboxyl, functioning to adjust the solubility of the polymer in the solvent.

The fourth side chain 5 is not a necessary structure of the polymer and is a rigid side chain composed of chain segments that contain 2-3 rings, functioning to adjust the strength of vertical alignment force that the polymer applies to the liquid crystal molecules.

The solvent is selected from one of or a mixture of multiple ones of N-methyl-2-pyrrolidone (NMP), N-ethyl-2-pyrrolidone (NEP), γ-butyrolactone (γ-BL), ethylene glycol mono-n-butyl ether, and dimethylacetamide (DMA).

Examples will be discussed to describe the present invention.

Example 1

The material for alignment layer of liquid crystal medium used is polyimide polymer having the following formula IV, which comprises a polyimide backbone and a first side chain, wherein the first side chain takes a ratio of 20%. The first side chain has a flexible chain segment that is a saturated chain containing 5 carbon atoms and a rigid chain segment that comprises two benzene rings and one cyclohexane. The benzene ring contains two symmetric CN moieties to provide the first side chain with extremely strong lateral dipole moment. The terminal moiety of the first side chain is a carbon chain of 4 carbon atoms. The solvent comprises a primary constituent of NMP (N-methyl-2-pyrrolidone) and additionally comprises other components of solvent. The solid content of the polymer in the material of alignment layer is approximately 4%.

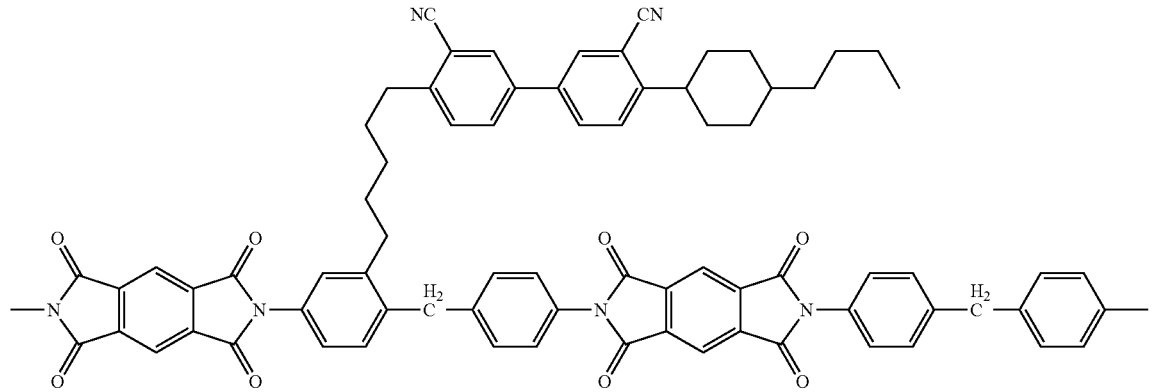

Formula IV

Example 2

The material for alignment layer of liquid crystal medium used is polyimide polymer having the following formula V, which comprises a polyimide backbone and a first side chain, wherein the first side chain takes a ratio of 30%. The first side chain has a flexible chain segment that is a saturated chain containing 5 carbon atoms and a rigid chain segment that comprises two benzene rings and one cyclohexane. The benzene ring contains a F substituted moiety to provide the first side chain with extremely strong lateral dipole moment. The terminal moiety of the first side chain is a carbon chain of 4 carbon atoms. The solvent comprises a primary constituent of NMP (N-methyl-2-pyrrolidone) and additionally comprises other components of solvent. The solid content of the polymer in the material of alignment layer is approximately 4%.

In summary, the present invention provides a material for alignment layer of liquid crystal display, which includes a polymer of which the molecular structure is characterized in that the polymer comprises a backbone to which a first side chain that contains both a flexible chain segment and rigid chain segment is linked and the first side chain has a stronger lateral dipole moment, making it taking a rotation or tilting motion under the application of an electric field so as to effect alignment of the liquid crystal molecules in the pre-tilt angle. Since the first side chain is linked to the backbone of the polymer, the degree of freedom for motion is less than that of the liquid crystal molecules, so that even the electrical field is removed after the formation of the pre-tilt angle, the alignment effect so provided does not vanish immediately and will maintain for a period of time, which is related to the specific structure of the first side chain used. In respect of multiple angle alignment, as compared to polymer stabilized vertical alignment, the present invention is simple in manufacturing process and may form an alignment film that has a flatter surface and smaller light leak and provide a liquid crystal panel with increased contrast so as to improve the optical performance of the liquid crystal panel.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A material for alignment layer of liquid crystal display, comprising a solvent and a polymer dissolved in the solvent, the polymer comprising a backbone and a first side chain linked to the backbone, the first side chain having a stronger lateral dipole moment;

wherein the backbone of the polymer comprises a structure of polyimide or polyamic acid, which has the following formula:

Formula V

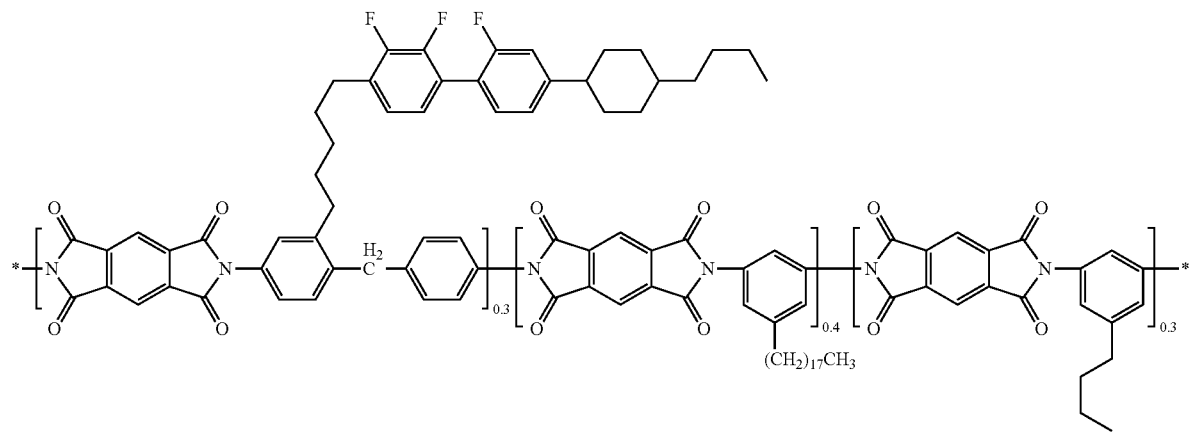

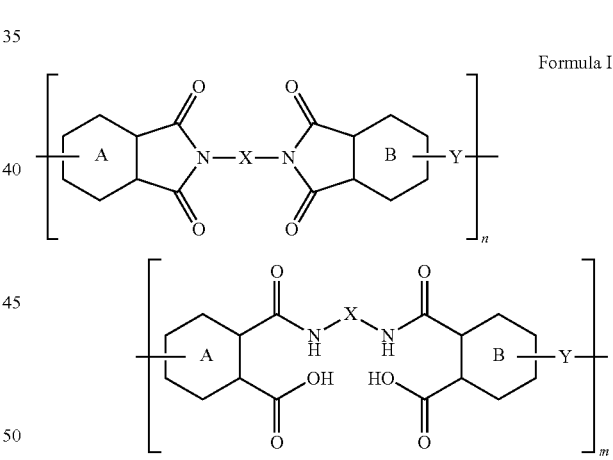

Formula I wherein the ring A and ring B are benzene rings, aromatic rings, or fused-ring aromatic compounds; X and Y are linking moieties; and n and m represent the degree of polymerization, the values of n and m being in a range of 20 to 2000.

2. The material for alignment layer of liquid crystal display as claimed in claim 1, wherein X and Y are represented by the following formulas:

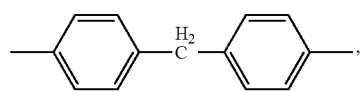

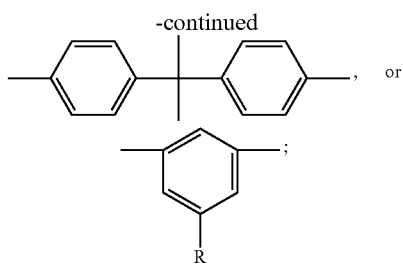

the value of n and m are in the range of 50 to 500 and R is a terminal moiety.

3. The material for alignment layer of liquid crystal display as claimed in claim 1, wherein the first side chain of the polymer comprises two obviously distinguished segmented structures, which are respectively a flexible chain segment linked to the backbone and a rigid chain segment linked to the flexible chain segment, the rigid chain segment having a stronger lateral dipole moment.

4. The material for alignment layer of liquid crystal display as claimed in claim 3, wherein the first side chain of the polymer has one of the following formulas:

Formula II

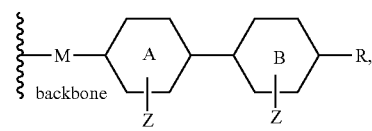

Formula III

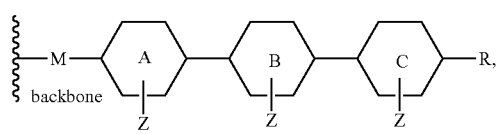

wherein in formulas II and III, M is the flexible chain linked to the backbone and is formed by a molecular main chain composed of 3-25 C, O, S, N, and Si atoms; ring A, ring B and ring C are five- or six-membered rings or ring structures with or without N, S, and O heteroatoms; rings A, B, and C are identical or different, rings A, B and C being saturated, unsaturated, or aromatic rings; Z is substituted moiety on rings A, B and C and can be identical or different, being mono-substituted or polysubstituted on a single ring is allowable, Z is —CN, —F, —Cl, —Br, —NCS, —CF$_3$, —OCF$_3$, or —OCHF$_2$; R is the terminal moiety of the first side chain which is a carbon chain composed of H or 1-8 carbons.

5. The material for alignment layer of liquid crystal display as claimed in claim 1, wherein the first side chain of the polymer takes 5-40% molecular weight of the polymer.

6. The material for alignment layer of liquid crystal display as claimed in claim 1, wherein the polymer further comprises one, two or all of a second side chain, a third side chain, and a fourth side chain.

7. The material for alignment layer of liquid crystal display as claimed in claim 6, wherein the second side chain is a flexible side chain, which is formed by a molecular main chain composed of 3-25 C, O, S, N, or Si atoms; the third side chain is a polar side chain, which is hydroxyl, carboxyl, or a ring structure contains hydroxyl or carboxyl; the fourth side chain is a rigid side chain composed of chain segments that contain 2-3 rings.

8. The material for alignment layer of liquid crystal display as claimed in claim 1, wherein the polymer takes 1-20% total weight of the material for alignment layer.

9. The material for alignment layer of liquid crystal display as claimed in claim 1, wherein the solvent is selected from one of or a mixture of multiple ones of N-methyl-2-pyrrolidone, N-ethyl-2-pyrrolidone, γ-butyrolactone, ethylene glycol mono-n-butyl ether, and dimethylacetamide.

10. A material for alignment layer of liquid crystal display, comprising a solvent and a polymer dissolved in the solvent, the polymer comprising a backbone and a first side chain linked to the backbone, the first side chain having a stronger lateral dipole moment;

wherein the backbone of the polymer comprises a structure of polyimide or polyamic acid, which has the following formula:

Formula I

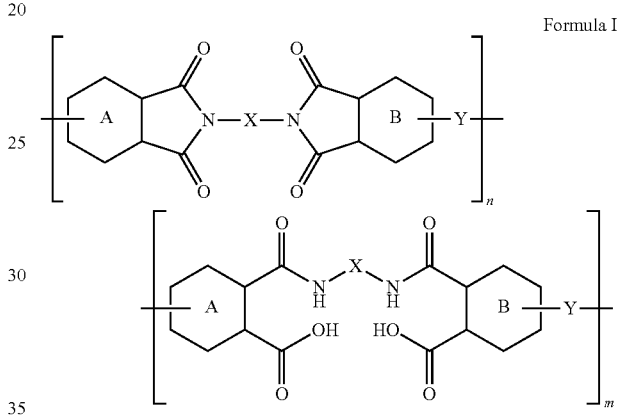

wherein the ring A and ring B are benzene rings, aromatic rings, or fused-ring aromatic compounds; X and Y are linking moieties; and n and m represent the degree of polymerization, the values of n and m being in a range of 20 to 2000;

wherein X and Y are represented by the following formulas:

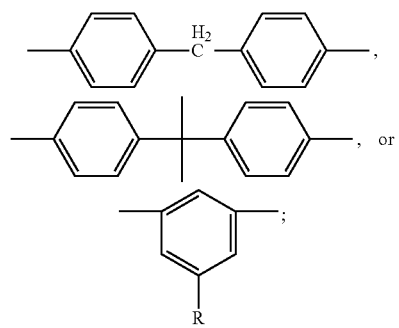

the value of n and m are in the range of 50 to 500;

wherein the first side chain of the polymer comprises two obviously distinguished structures which are respectively a flexible chain linked to the backbone and a rigid chain linked to the flexible chain, the rigid chain having a stronger lateral dipole moment;

wherein the first side chain of the polymer has one of the following formulas:

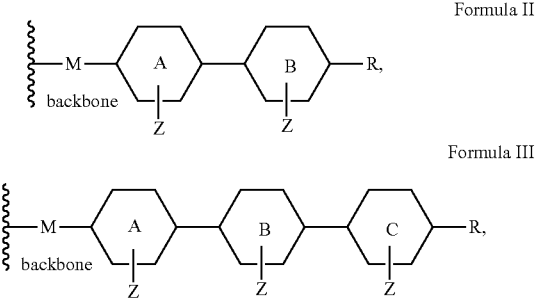

Formula II

Formula III wherein in formulas II and III, M is the flexible chain linked to the backbone and is formed by a molecular main chain composed of 3-25 C, O, S, N, and Si atoms; ring A, ring B and ring C are five- or six-membered rings or ring structures with or without N, S, and O heteroatoms; rings A, B, and C are identical or different, rings A, B and C being saturated, unsaturated, or aromatic rings; Z is substituted moiety on rings A, B and C and can be identical or different, being mono-substituted or polysubstituted on a single ring is allowable, Z is —CN, —F, —Cl, —Br, —NCS, —CF$_3$, —OCF$_3$, or —OCHF$_2$; R is the terminal moiety of the first side chain which is a carbon chain composed of H or 1-8 carbons;

wherein the first side chain of the polymer takes 5-40% molecular weight of the polymer;

wherein the polymer takes 1-20% total weight of the material for alignment layer; and wherein the solvent is selected from one of or a mixture of multiple ones of N-methyl-2-pyrrolidone, N-ethyl-2-pyrrolidone, γ-butyrolactone, ethylene glycol mono-n-butyl ether, and dimethylacetamide.

* * * * *